(12) United States Patent
Hale (10) Patent No.: US 8,919,241 B2
(45) Date of Patent: Dec. 30, 2014

(54) BEVERAGE MACHINE BREWING CHAMBER AND EXTRACTION MEMBER FOR A BEVERAGE DISPENSING MACHINE

(76) Inventor: Robert Hale, Toronto (CA)

( * ) Notice: Subject to any disclaimer, the term of this patent is extended or adjusted under 35 U.S.C. 154(b) by 1124 days.

(21) Appl. No.: 12/461,616

(22) Filed: Aug. 18, 2009

(65) Prior Publication Data

US 2011/0041699 A1    Feb. 24, 2011

(51) Int. Cl.
 *A47J 31/06* (2006.01)
 *A47J 31/44* (2006.01)
 *A47J 31/36* (2006.01)

(52) U.S. Cl.
 CPC ............... *A47J 31/446* (2013.01); *A47J 31/36* (2013.01)
 USPC .............................................. 99/295; 99/275

(58) Field of Classification Search
 USPC ....... 99/295, 300, 275, 302 R, 317, 279, 304, 99/306, 307, 316, 321
 See application file for complete search history.

(56) References Cited

U.S. PATENT DOCUMENTS

| | | | |
|---|---|---|---|
| 4,452,130 A | 6/1984 | Klein | |
| 5,325,765 A * | 7/1994 | Sylvan et al. | .................. 99/295 |
| 5,840,189 A | 11/1998 | Sylvan et al. | |
| 6,079,315 A | 6/2000 | Beaulieu et al. | |
| 6,142,063 A | 11/2000 | Beaulieu et al. | |
| 6,182,554 B1 | 2/2001 | Beaulieu et al. | |
| 6,425,317 B1 * | 7/2002 | Simmons | ........................ 99/299 |
| 6,440,256 B1 | 8/2002 | Gordon et al. | |
| 6,589,577 B2 | 7/2003 | Lazaris | |
| 6,606,938 B2 | 8/2003 | Taylor | |
| 6,607,762 B2 | 8/2003 | Lazaris | |
| 6,645,537 B2 | 11/2003 | Sweeney et al. | |
| 6,655,260 B2 | 12/2003 | Lazaris et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| 7,165,488 B2 | 1/2007 | Bragg et al. | |
| 7,347,138 B2 | 3/2008 | Bragg et al. | |
| 7,398,726 B2 | 7/2008 | Streeter et al. | |
| 7,513,192 B2 | 4/2009 | Sullivan et al. | |
| 2005/0183578 A1 | 8/2005 | Mandralis et al. | |
| 2006/0174769 A1 * | 8/2006 | Favre et al. | ..................... 99/275 |

* cited by examiner

*Primary Examiner* — Dana Ross
*Assistant Examiner* — Phuong Nguyen
(74) *Attorney, Agent, or Firm* — Breneman & Georges (57) ABSTRACT

According to embodiments described in the specification, a brewing chamber for a beverage machine is provided comprising a housing having upper and lower ends and a channel extending between the upper and lower ends; an outlet portion of the channel configured to direct liquid towards the lower end; an extraction member extending from an inner surface defined by a wall of the outlet portion, the extraction member having an upper penetrating end for penetrating a cartridge and an anchoring end abutting the wall; the extraction member further having guide means for guiding liquid from the penetrating end onto the inner surface. The brewing chamber can include at least one spring coupled to the housing at the inlet end, the at least one spring receivable within a pocket of a support insert supporting a cartridge. The spring centers the support insert over the housing and facilitates ejection of the support insert.

11 Claims, 8 Drawing Sheets

BEVERAGE MACHINE BREWING CHAMBER AND EXTRACTION MEMBER FOR A BEVERAGE DISPENSING MACHINE

FIELD

The specification relates generally to beverage dispensing machines, and specifically to a brewing chamber and extraction member for a beverage dispensing machine.

BACKGROUND

Single-serving beverage dispensing machines are commonly used, for example in office or residential settings, for providing quick, convenient and freshly prepared beverage servings. In general, beverages are produced in such machines from disposable cartridges containing soluble products such as coffee grounds or tea leaves.

The beverage making process generally involves the injection of hot water under pressure into the cartridge, through the beverage product, and out of the cartridge into a cup or mug. The beverage can be recovered from the cartridge for dispensing into the cup or mug via a hollow needle that punctures the cartridge. Although care is taken to seal the area around the puncture in an attempt to prevent liquid from leaving the cartridge around the outside of the needle, some liquid can still escape in this manner. This can necessitate a collecting surface around the needle to capture the escaped liquid in order to dispense it to the cup or mug. In some cases, a further collecting surface is then provided, onto which liquid flowing through the needle and escaped liquid both drain before being dispensed to the cup or mug. Additional surfaces can provide additional opportunities for contamination of the beverage.

The hollow needles used to recover beverage can also suffer from blockages by particles of product from within the cartridge.

SUMMARY

A brewing chamber is provided, comprising a housing with inlet and outlet ends. A channel extends between the inlet and outlet ends, and a lower outlet portion of the channel directs liquid towards the outlet end of the housing. An extraction member extends from an inner surface defined by a wall of the channel outlet portion. The extraction member includes an upper or penetrating end for penetrating a cartridge and an opposing lower or anchoring end abutting the wall of the outlet portion of the channel. The extraction member also includes guide means for guiding liquid from the penetrating end onto the inner surface.

BRIEF DESCRIPTIONS OF THE DRAWINGS

Embodiments are described with reference to the following figures, in which.

DETAILED DESCRIPTION OF THE EMBODIMENTS

Figure 1:
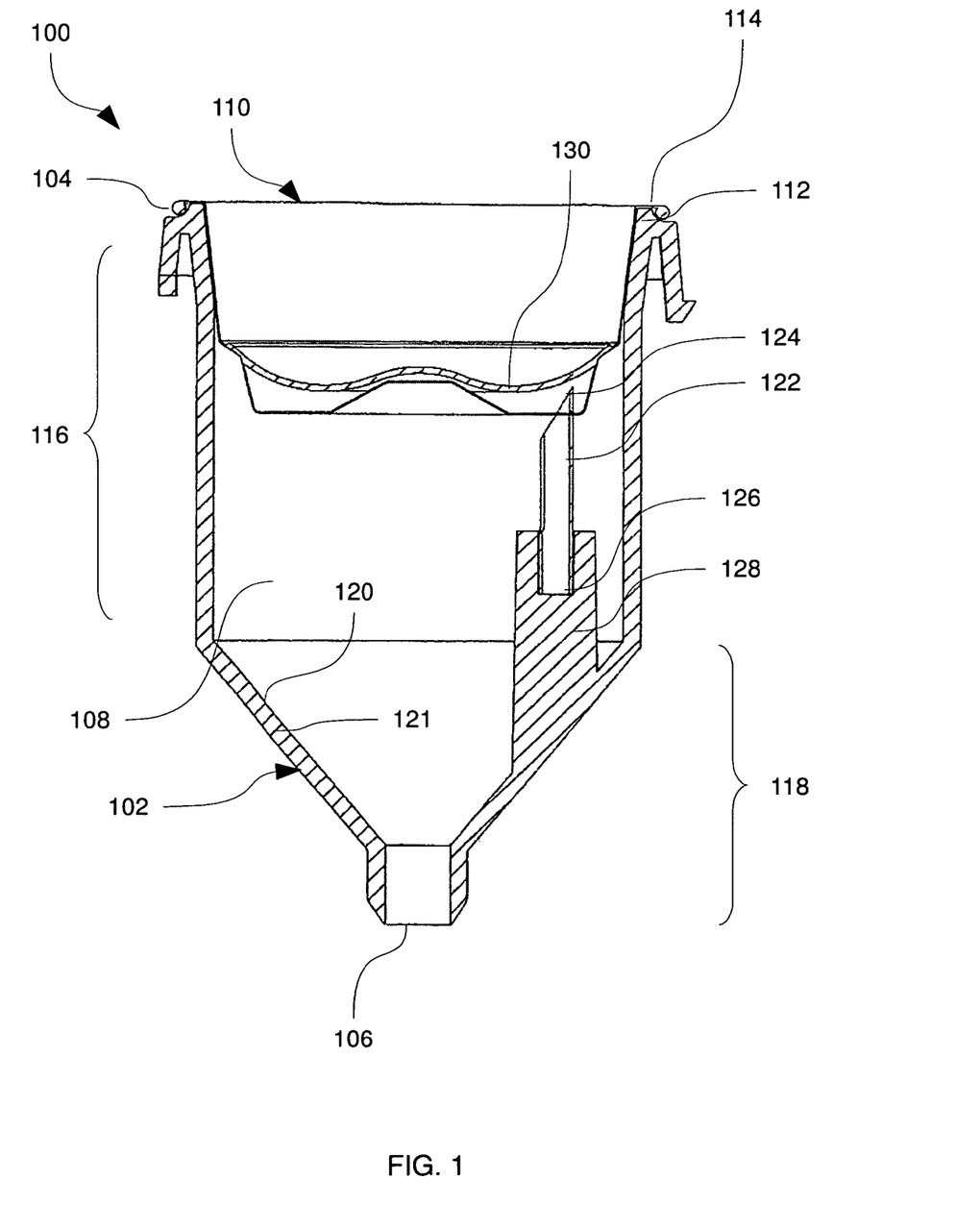
FIG. 1 is a cross-section elevational view of a brewing chamber, according to a non-limiting embodiment.

FIG. 1 depicts a brewing chamber 100 according to a non-limiting embodiment. Brewing chamber 100 can be used in a single-serving beverage machine (not shown), as will be appreciated by those skilled in the art.

Brewing chamber 100 includes a housing 102 having an upper or inlet end 104 and a lower or outlet end 106. Housing 102 can be made from any of a variety of plastics, though other suitable materials will also occur to those skilled in the art. A channel 108 extends between inlet end 104 and outlet end 106. When brewing chamber 100 is in use, a cartridge 110 is received within channel 108 at inlet end 104 of housing 102. Housing 102 includes support means for maintaining cartridge 110 within channel 108 near inlet end 104, as shown in FIG. 1. In the exemplary embodiment of FIG. 1, the support means include a rim 112 at inlet end 104 of housing 102. A lip 114 extending from the upper circumference of cartridge 110 engages rim 112, maintaining cartridge 110 in the position shown in FIG. 1 while brewing chamber 100 is in use.

Housing 102 can be substantially annular in horizontal cross section as depicted in FIG. 1. That is, an upper or inlet portion 116 of channel 108, and the corresponding exterior wall of housing 102, can be substantially cylindrical in shape. It will now be apparent, however, that other suitable shapes of housing 102 can also be used, for example to match the characteristics of a particular beverage machine (not shown) or cartridge with which brewing chamber 100 is to be used. It will also be appreciated that the outer shape of housing 102 need not necessarily match the shape of channel 108. For example, inlet portion 116 of channel 108 can remain substantially cylindrical in other embodiments (not shown), though the exterior wall of housing 102 can have the shape of a rectangular prism.

A lower or outlet portion 118 of channel 108 can be configured for directing liquid towards outlet end 106 of housing 102, where liquid can exit housing 102 towards a receptacle such as a drinking mug (not shown). In the exemplary embodiment of FIG. 1, outlet portion 118 has a substantially conical shape that tapers downwardly to outlet end 106 of housing 102. As such, any liquid contacting an inner surface 120 defined by a wall 121 of outlet portion 118 flows along inner surface 120 towards outlet end 106 to be dispensed from brewing chamber 100 to a receptacle (not shown).

Brewing chamber 100 also includes an extraction member 122 extending into channel 108 from inner surface 120 of outlet portion 118. Extraction member 122 includes an upper or penetrating end 124 for penetrating a wall of cartridge 110 when brewing chamber 100 is in use. Extraction member 122 also includes an opposing lower or anchoring end 126 which can be in an abutting relationship with wall 121. In the exemplary embodiment of FIG. 1, inner surface 120 extends upwardly into channel 108 as a result of a thickening or protuberance 128 of wall 121, upon which extraction member 122 is supported. Anchoring end 126 is actually embedded within protuberance 128, in addition to abutting protuberance 128. It will be appreciated that other configurations are also contemplated. For example, in an alternative embodiment, protuberance 128 can be omitted entirely, with a longer extraction member 122 being provided instead. It will also be understood that while extraction member 122 is depicted as extending from protuberance 128 of wall 121 substantially vertically, other orientations are also contemplated. In general, extraction member 122 can extend upwardly from inner surface 120 in any orientation that allows liquid to flow from upper penetrating end 124 to inner surface 120.

When brewing chamber 100 is in use, cartridge 110 is received within brewing chamber 100 at inlet end 104 of housing 102, and is supported by rim 112. Extraction member 122 is so located that when cartridge 110 is received at inlet end 104, penetrating end 124 penetrates a wall of cartridge 110. A fluid, for example hot water, is injected into cartridge 110 by way of injection means (not shown) and mixes with a product contained above a filter 130 within cartridge 110. Brewed beverage liquid passes through filter 130, and exits cartridge 110 at the location penetrated by extraction member 122. The extracted liquid then flows from penetrating end 124, along guide means of extraction member 122 (to be discussed in greater detail below) and onto inner surface 120 defined by wall 121 of outlet portion 118 (more particularly, in the embodiment of FIG. 1, the liquid flows onto inner surface 120 at protuberance 128 of wall 121). From inner surface 120, the extracted liquid flows out from outlet end 106 and into a waiting receptacle (not shown).

Figure 2:
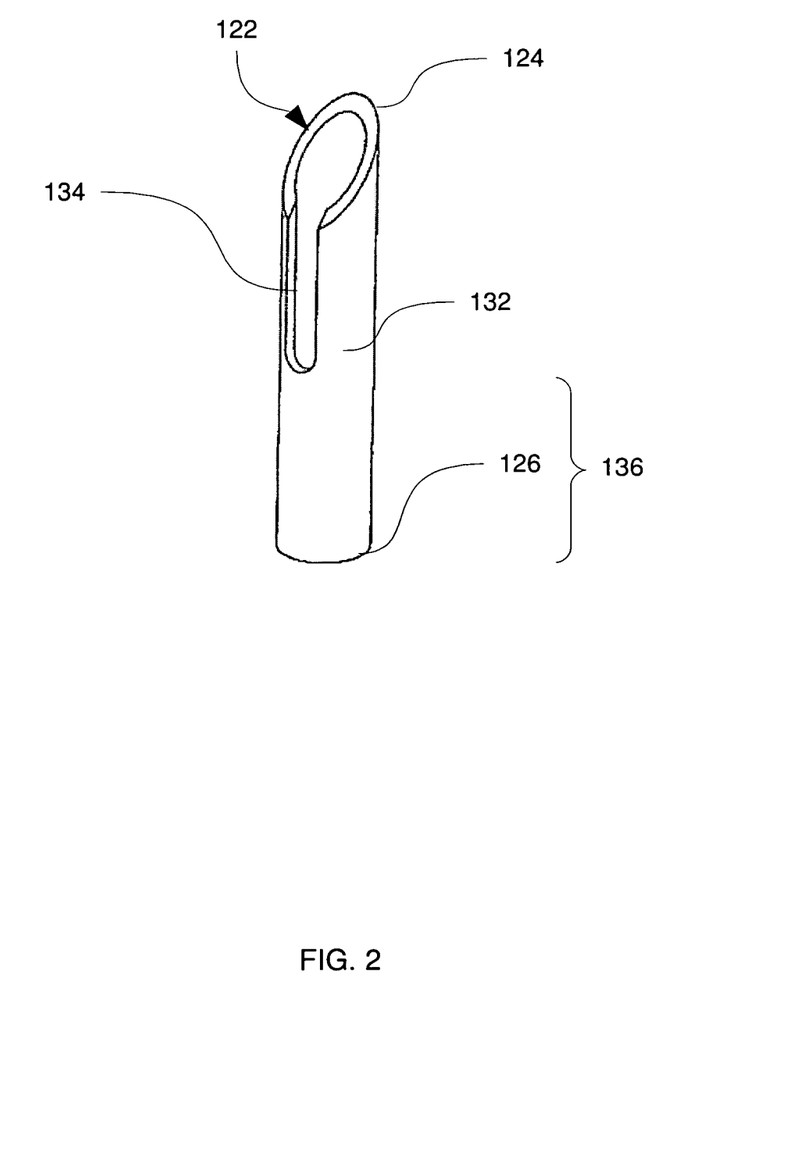
FIG. 2 is a perspective view of an extraction member for the brewing chamber of FIG. 1, according to a non-limiting embodiment.

FIG. 2 depicts extraction member 122 in greater detail, according to a non-limiting embodiment. Particularly, the guide means of extraction member 122 can include a substantially tubular member 132 having a longitudinal chase or slot 134 cut into a side thereof. Longitudinal slot 134 can begin at penetrating end 124 as shown in FIG. 2, but need not extend along the entire length of tubular member 132. As shown in FIG. 2, longitudinal slot can extend only partially along the length of tubular member 132 towards anchoring end 126. Penetrating end 124 can be the angled top of tubular member 132, thus providing a sharp point for penetrating a wall of cartridge 110. Referring briefly to FIG. 1, while tubular member 132 is shown as being hollow along its entire length, it will be appreciated that this is not strictly necessary. As anchoring end 126 of extraction member 122 abuts protuberance 128 of wall 121, any liquid flowing along the internal surface of tubular member 132 must exit the side of extraction member 122 via longitudinal slot 134 rather than exiting extraction member 122 via anchoring end 126. Thus, tubular member 132 can, in other exemplary embodiments, be partially obstructed, for example along portion 136 of its length, which is located below longitudinal slot 134 (that is, between the lower end of longitudinal slot 134 and anchoring end 126). The obstruction can be provided by portion 136 being solid, or being filled with another material.

It will now be appreciated that extraction member 122 can include any of a wide variety of guide means. For example, in another exemplary embodiment (not shown) the guide means of extraction member 122 can include a solid substantially cylindrical member with one or more longitudinal grooves cut into the surface thereof.

It will also be understood that while extraction member 122 is shown as being a separate component from housing 102, in other embodiments (not shown) extraction member 122 can be integrally formed with housing 102. For example, extraction member 122 and housing 102 can be manufactured as a single piece of material. Further, in some embodiments (not shown) there can be more than one extraction member 122. Multiple extraction members can serve to increase flow from cartridge 110.

Returning to FIG. 1, it will now be apparent that when beverage chamber 100 is in use, liquid can flow from penetrating end 124 of extraction member 122 onto either of the internal and external surfaces of tubular member 132. Liquid flowing along the internal surface then flows onto inner surface 120 after exiting tubular member 132 via longitudinal slot 134, while liquid flowing along the external surface flows directly onto inner surface 120 at protuberance 128 of wall 121.

Figure 3:
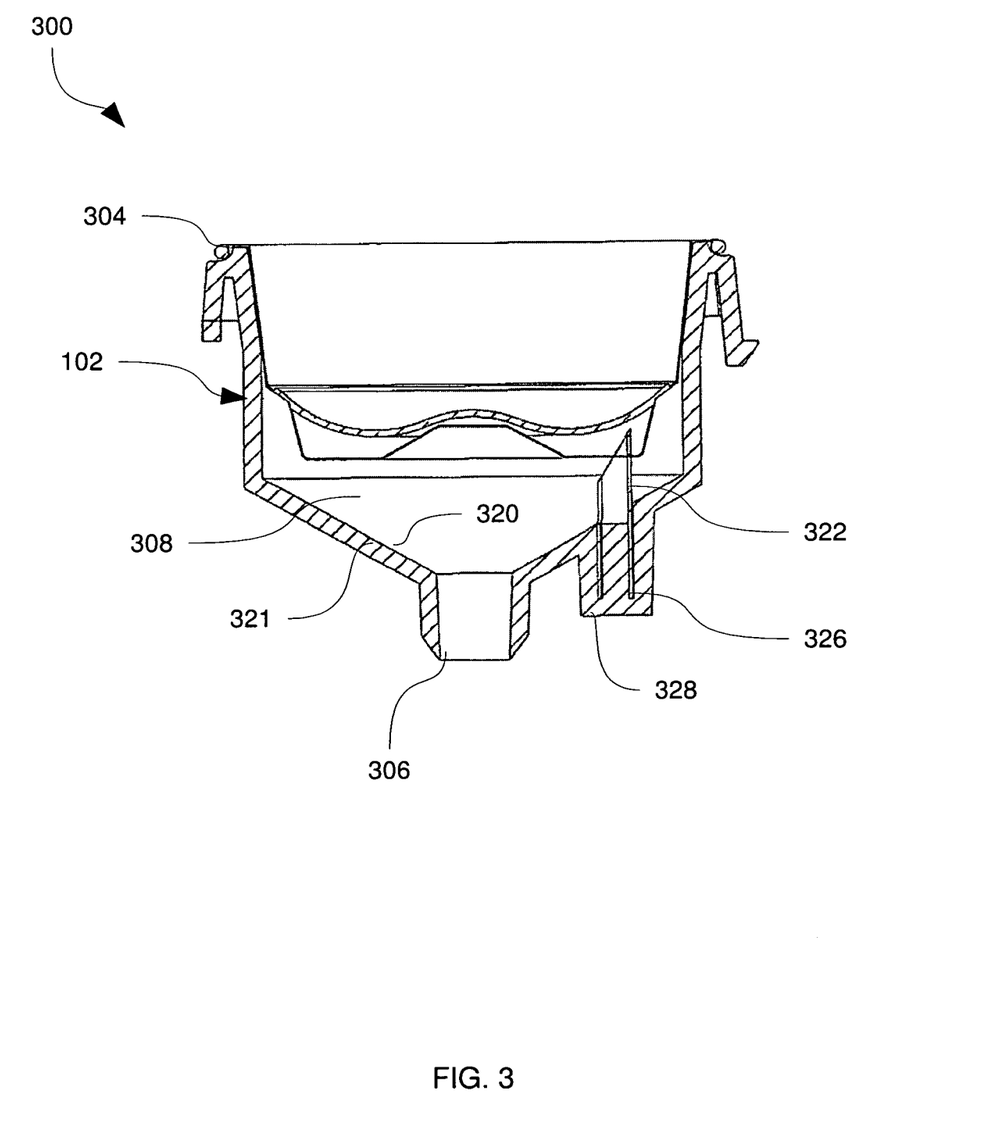
FIG. 3 is a cross-section elevational view of a brewing chamber, according to another non-limiting embodiment.

FIG. 3 depicts another embodiment, indicated generally at 300, of the brewing chamber depicted in FIG. 1. Elements of brewing chamber 300 that are similar to those of brewing chamber 100 bear similar reference numerals, with the exception that those of FIG. 3 begin with a "3" rather than a "1." Brewing chamber 300 thus includes a housing 302, an upper or inlet end 304 and a lower or outlet end 306 with a channel 308 extending therebetween. Of particular note in FIG. 3, an extraction member 322 extends upwardly into channel 308 from an inner surface 320 defined by a wall 321. Extraction member 322 has a lower or anchoring end 326 abutting and embedded within wall 321. It will be noted that wall 321 includes a thickened portion or protuberance 328 that extends outwardly from housing 302, rather than into channel 308.

Figure 4:
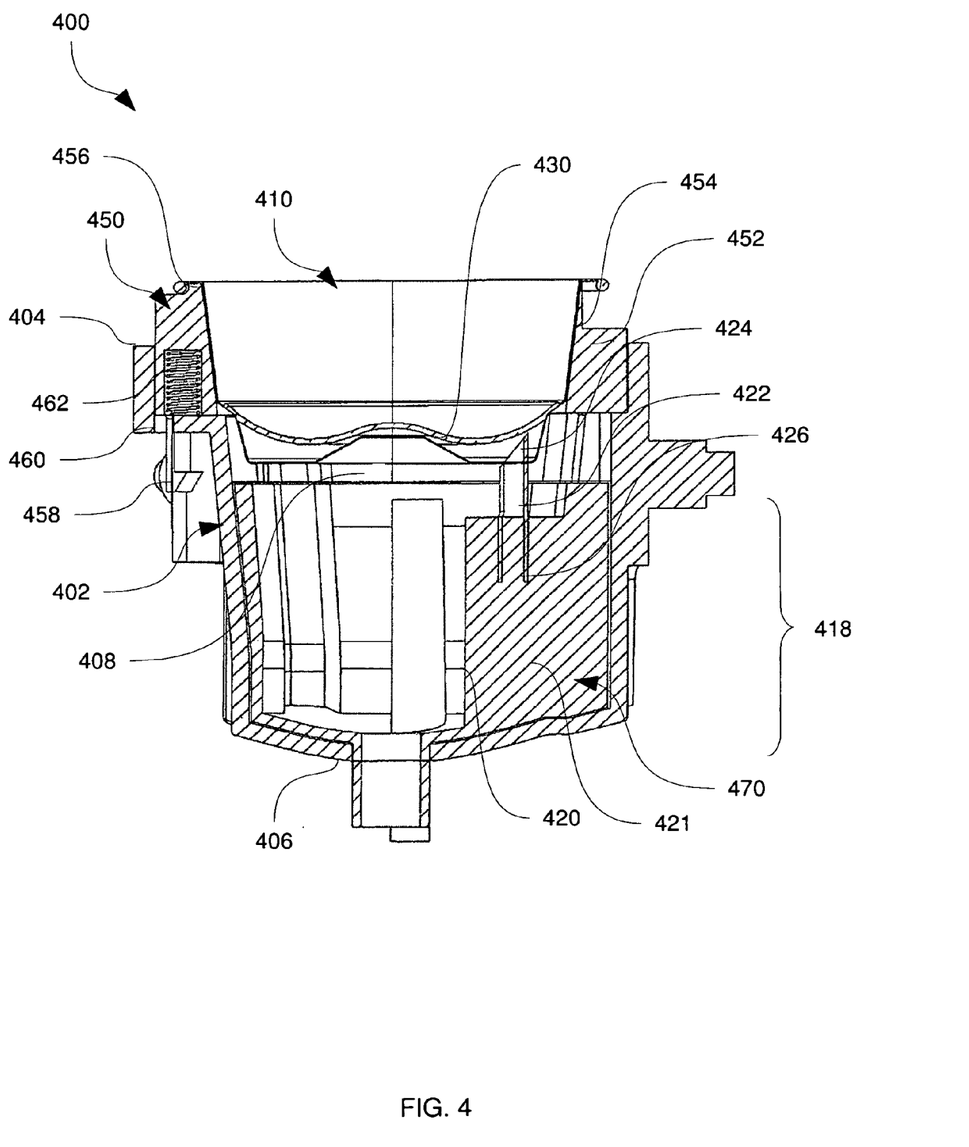
FIG. 4 is a cross-section elevational view of a brewing chamber, according to an additional non-limiting embodiment.

Referring now to FIG. 4, a brewing chamber 400 is depicted according to an additional non-limiting embodiment. Elements of brewing chamber 400 which are similar to those of brewing chamber 100 discussed above bear similar reference numerals in FIG. 4, with the exception that those in FIG. 3 begin with a "4" rather than a "1." Thus, brewing chamber 400 includes a housing 402 having upper or inlet and lower or outlet ends 404 and 406, respectively. A channel 408 extends between inlet end 404 and outlet end 406. Brewing chamber 400 includes support means for maintaining a cartridge 410 (having an internal filter 430) within channel 408 near inlet end 404 of housing 402.

An outlet portion 418 of channel 408 can be configured for directing liquid towards outlet end 406 of housing 402, where liquid can exit housing 402 towards a receptacle (not shown).

In the exemplary embodiment of FIG. 4, outlet portion 418 of channel 408 has a substantially cylindrical shape with a tapered portion near outlet end 406 of housing 402. Thus any liquid contacting an inner surface 420 defined by a wall 421 of outlet portion 418 flows along inner surface 420 towards outlet end 406 to be dispensed from brewing chamber 400 to a receptacle (not shown).

Brewing chamber 400 also includes an extraction member 422 extending into channel 408 from inner surface 420 of outlet portion 418. Extraction member 422 includes an upper or penetrating end 424 for penetrating a wall of cartridge 410 when brewing chamber 400 is in use. Extraction member 422 also includes a lower or anchoring end 426 which can be in an abutting relationship with wall 421. In the embodiment depicted in FIG. 4, lower end 426 is actually embedded within wall 421, though it will be appreciated that this is not strictly necessary.

In the exemplary embodiment of FIG. 4, the support means for maintaining cartridge 410 near inlet end 404 of housing 402 comprise a support insert 450. Support insert 450 can be a separate component from housing 402, as shown in FIG. 4. Support insert 450 can include a substantially annular member 452 for receiving and encircling cartridge 410. Cartridge 410, when received within annular member 452, engages a support surface 454 and a rim 456, which act to maintain cartridge 410 in position near upper end 404.

Support insert 450 can also include a locking mechanism such as a latch 458 for fastening support insert 450 to housing 402 when support insert 450 is received within housing 402 on a ledge 460 of housing 402. Latch 458 can protrude through an opening in ledge 460 and engage housing 402 below ledge 460, thus preventing support insert from being removed from housing 402 until latch 458 is disengaged. Housing 402 can additionally include bias means, such as one or more springs 462, for biasing support insert 450 upwards, away from ledge 460. Such biasing ensures that latch 458 remains firmly engaged with housing 402. The one or more springs 462 can be coupled to housing 402, and compress as support insert 450 is lowered onto housing 402. The one or more springs 462 facilitate ejection of support insert 450 and cartridge 410, and also facilitate the proper positioning of support insert 450 on housing 402.

Wall 421, and thus inner surface 420, of outlet portion 418 can be provided, in the exemplary embodiment of FIG. 4, by an extraction insert 470. Extraction insert 470, as with housing 402 and support insert 450, can have a body constructed of any suitable material (e.g. plastic) that will occur to those skilled in the art. Extraction insert 470 has upper and lower ends and a passageway extending therebetween which communicates with channel 408, effectively becoming a part of channel 408 when extraction insert is in place within brewing chamber 400. The exterior surface of an insert body of extraction insert 470 can conform to the shape of an interior surface of housing 402, in order to provide a snug fit for extraction insert 470 within housing 402. Thus, in the present exemplary embodiment as shown in FIG. 4, extraction insert 470 can have a substantially cylindrical shape.

Extraction member 422 is embedded within wall 421 as provided by extraction insert 470. It will be appreciated that while extraction member 422 is shown as a separate component, in other embodiments (not shown) extraction member 422 can be an integral part of extraction insert 470. It will be noted that while extraction member 422 is substantially as depicted in FIG. 2, the lower portion (indicated as 136 in FIG. 2) of extraction member 422 is not hollow, but rather is solid. More specifically, in the exemplary embodiment of FIG. 4, the lower portion of extraction member 422 is filled with the material of extraction insert 470. Extraction insert 470 includes an outlet at the lower end of extraction insert 470, coinciding with outlet end 406 of housing 402.

Figure 5:
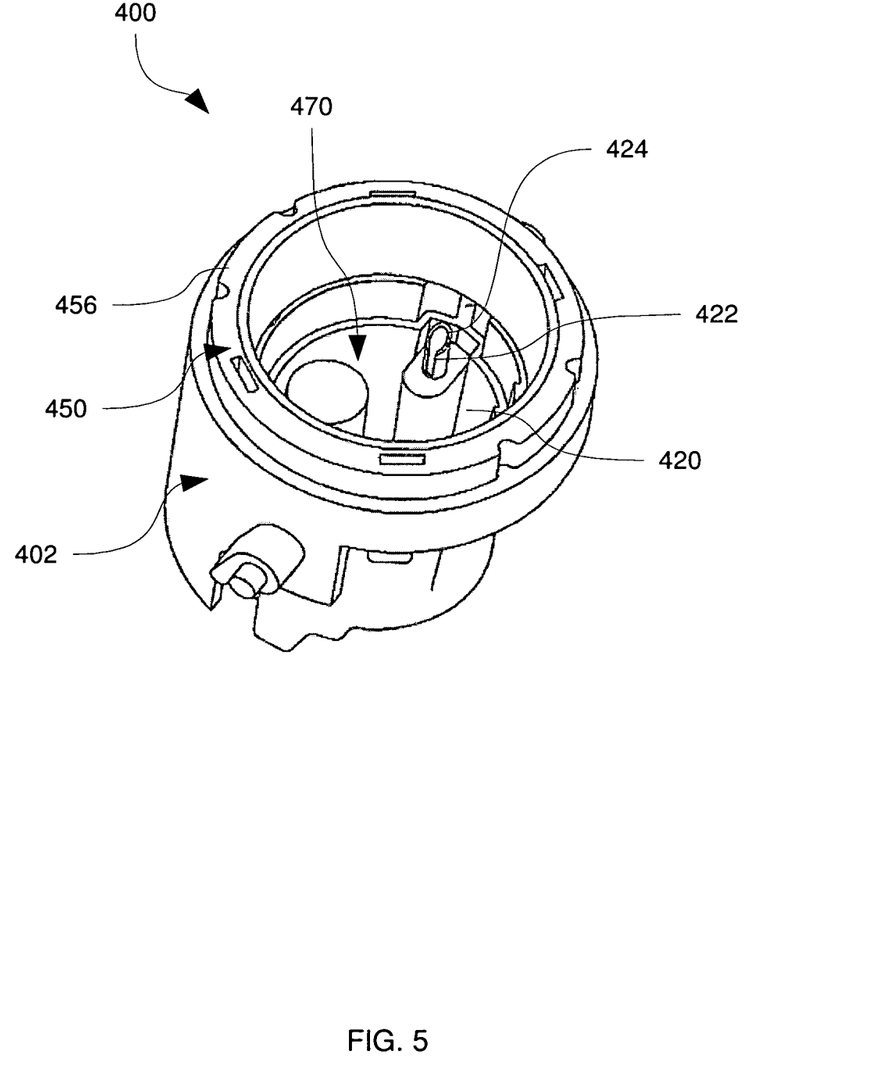
FIG. 5 is a perspective view of the brewing chamber of FIG. 4.
Figure 6:
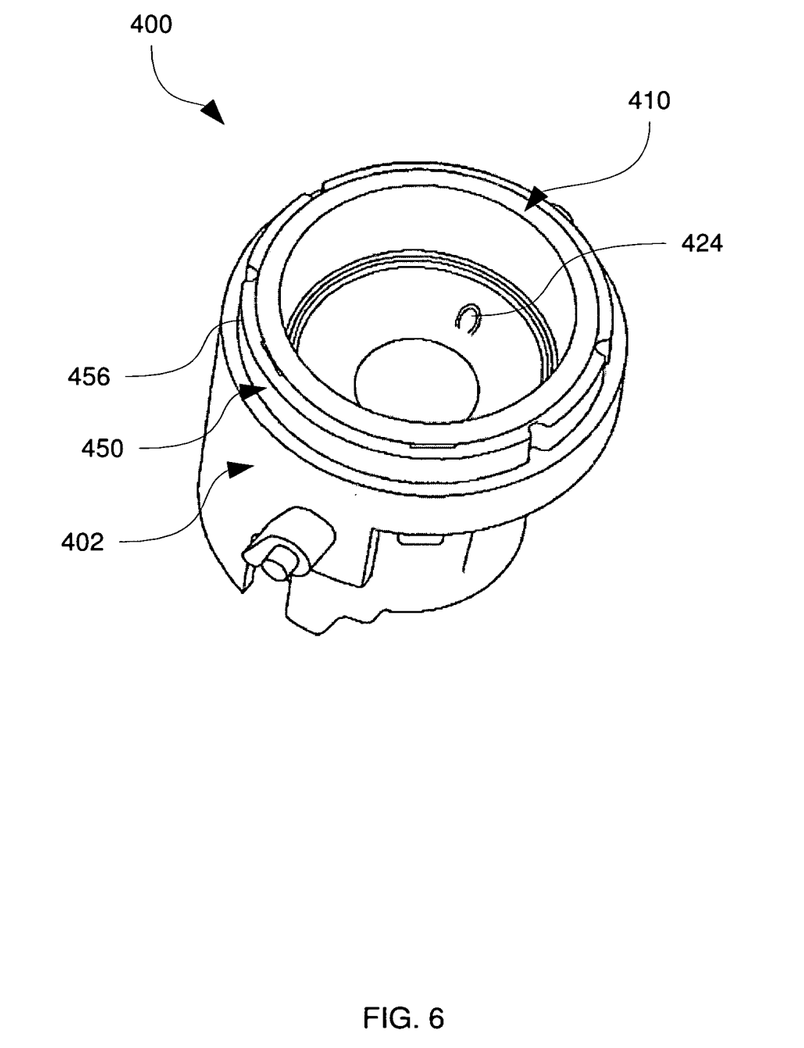
FIG. 6 is a further perspective view of the brewing chamber of FIG. 4.

FIG. 5 provides a perspective view of beverage chamber 400 with cartridge 410 removed. FIG. 6 provides a perspective view of beverage chamber 400 with cartridge 410 in place. However, in FIG. 6 the cover, as well as filter 430, of cartridge 410 have been removed. Penetrating end 424 of extraction member 422 is thus visible, having penetrated the bottom wall of cartridge 410. It will be noted that it is not necessary that the whole of the upper surface of penetrating end 424 penetrate cartridge 410.

Figure 7:
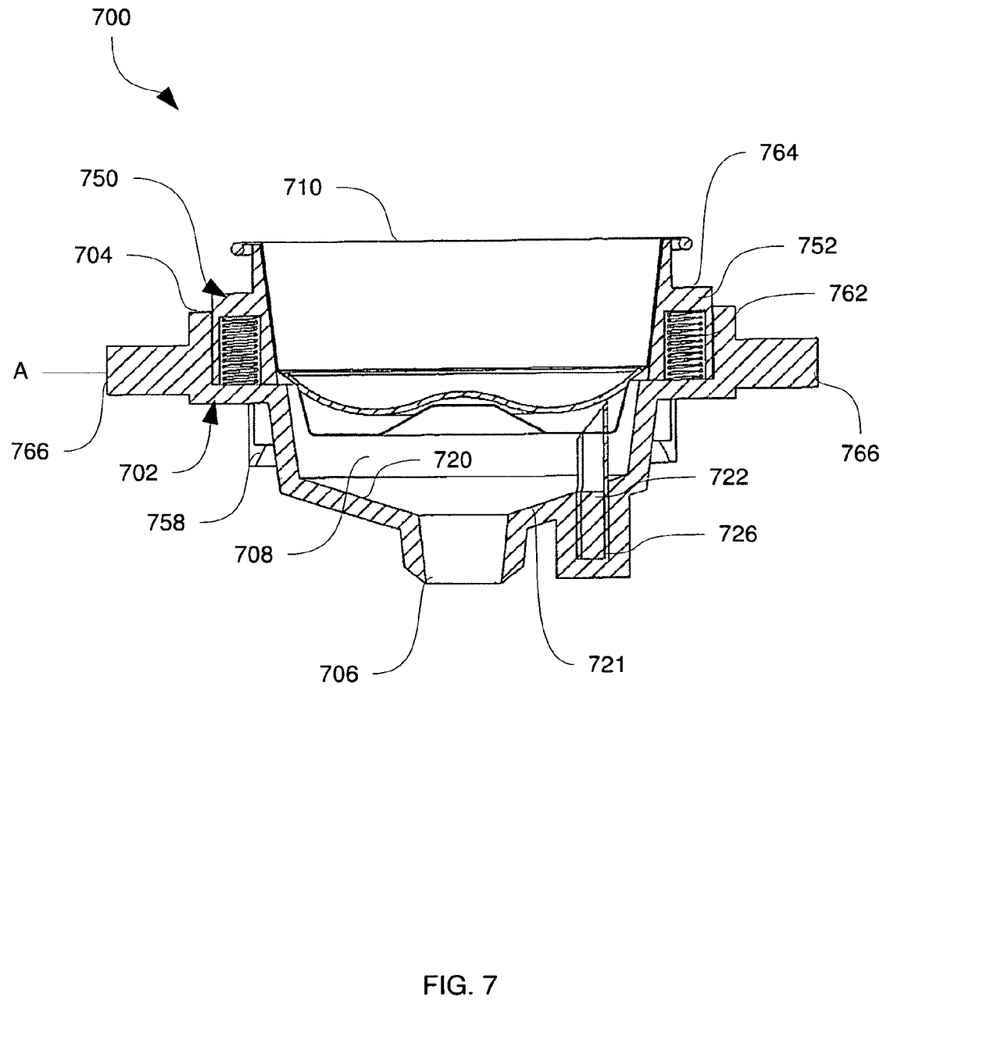
FIG. 7 is a cross-section elevational view of a brewing chamber according to a further non-limiting embodiment.

Referring now to FIG. 7, a further non-limiting embodiment of a brewing chamber, indicated generally at 700, is depicted. Elements of brewing chamber 700 that are similar to those of brewing chambers discussed above bear similar reference numerals, but beginning with "7" rather than "1," "3" or "4." Thus, brewing chamber 700 includes a housing 702 with an inlet end 704, an outlet end 706 and a channel 708 extending therebetween. A cartridge 710 can be received within channel 708 at inlet end 704, and pierced by an extraction member 722. Extraction member 722 extends upwardly into channel 708 from an inner surface 720 defined by a wall 721. An anchoring end 726 of extraction member 722 is abutting with and embedded within wall 721.

Support means for cartridge 710 is provided by a support insert 750, which can be a separate component from housing 702. Support insert 750 can include a substantially annular member 752 for receiving and encircling cartridge 710. Support insert 750 thus supports cartridge 710 in substantially the same manner as described above in relation to support insert 450.

Support insert 750 can also include a latch 758 or other locking mechanism for fastening support insert 750 to housing 702. Housing 702 can also include bias means coupled to housing 702, such as a plurality of springs 762, for biasing support insert 750 upwards. The plurality of springs 762 are receivable within channels or pockets extending upwardly into annular member 752. When support insert 750 is placed onto housing 702, therefore, springs 762 enter the pockets and compress upon contacting the end of the pockets. Springs 762 thus control the descent of support insert 750 onto housing 702, and also facilitate ejection of support insert 750 and cartridge 710 from housing 702. By way of being receivable in the pockets extending upwardly into annular member 752, springs 762 can also ensure that support insert 750 is properly centered over housing 702 during insertion. If support insert 750 is not properly centered, springs 762 will not line up with the pockets in annular member 752 and support insert 750 will not be allowed to lower onto housing 702.

Support insert 750 can also include one or more shoulders 764 on annular member 752. A portion of cartridge 710 can be allowed to overhang shoulders 764 to assist in removal of cartridge 710, as will be described below. Housing 702 can also include axles 766 disposed on opposing sides of housing 702. Axles 766 can be received, for example, within corresponding openings in a brewing machine (not shown), to allow housing 702 to rotate about the axis "A" shown in FIG. 7. Such rotation can allow for easier removal of cartridge 710 from chamber 700, as will be discussed below.

Figure 8:
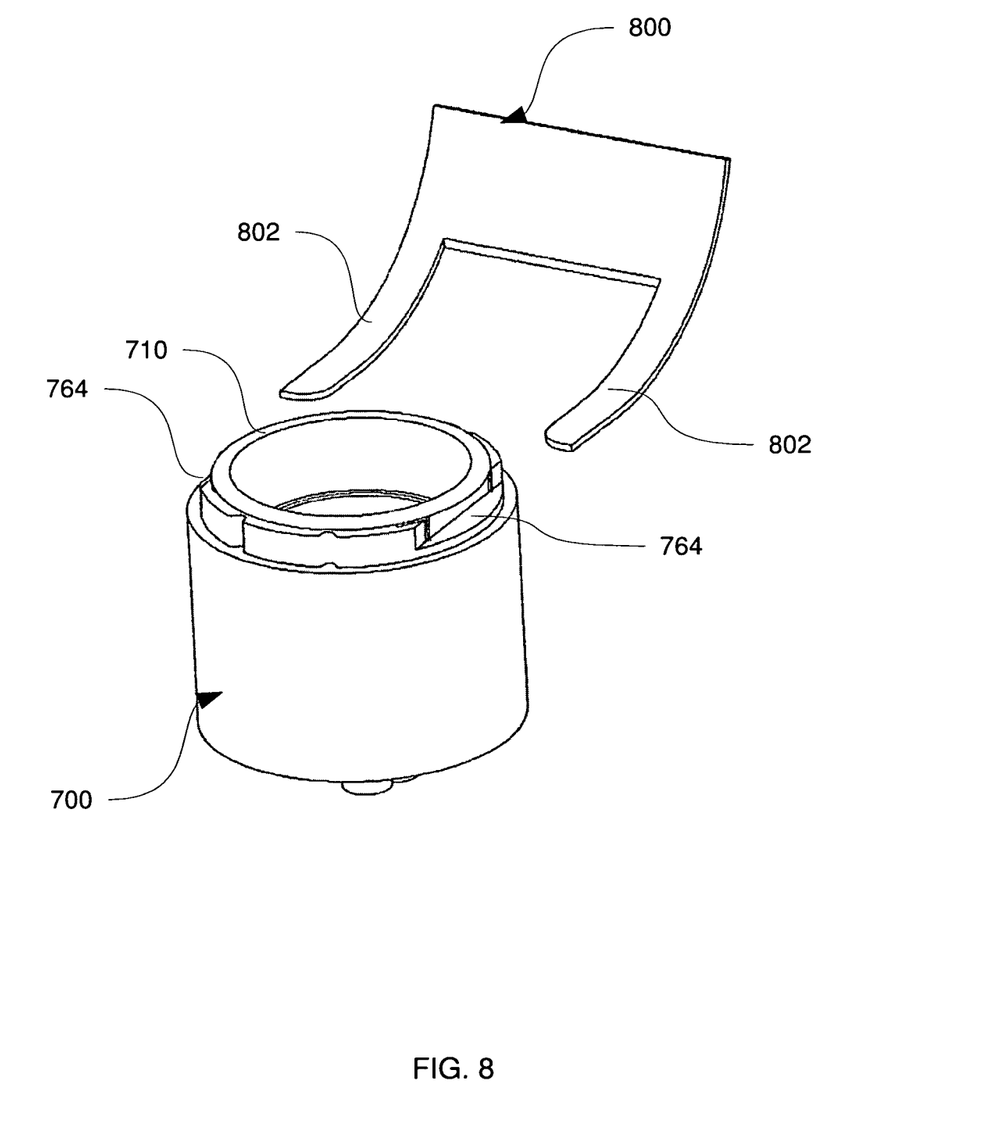
FIG. 8 is a perspective view of a brewing chamber and a removal member according to a non-limiting embodiment.

Referring now to FIG. 8, shoulders 764 are shown on a simplified illustration of brewing chamber 700 in a perspective view. Portions of cartridge 710 can overhang shoulders 764, thus providing space for the arms 802 of a removal member 800 for use with a brewing machine (not shown). Arms 802 can be inserted between the overhanging portions of cartridge 710 and shoulders 764, and removal member 800 can then be lifted, rotated or otherwise displaced to lift cartridge 710 out of support insert 750 without removing support insert 750 itself. It will be appreciated that any of the brewing chamber embodiments described herein can be provided with shoulders such as shoulders 764. It will also be noted that while axles 766 are not shown in FIG. 8, such axles can allow brewing chamber 700 to rotate as arms 802 engage shoulders 764 and cartridge 710, thus facilitating the removal of cartridge 710.

From the above description of the present embodiments, certain advantages will now be apparent to those skilled in the art. For example, the extraction member described herein reduces the need for sealing mechanisms at the point of penetration. Because the extraction member guides any liquid exiting the cartridge along guide means and onto the inner surface from which the extraction member extends, it is of little import whether liquid exits the cartridge onto one surface of the extraction member or another. The need is also reduced for additional collecting surfaces below the lower end of the housing, as all liquid is directed onto the same surface by the extraction member. The complexity and costs associated with producing and maintaining a brewing chamber as described herein can therefore be lowered, and the liquid extracted from the cartridge can come into contact with fewer surfaces, potentially leading to reduced contamination.

Other advantages will also occur to those skilled in the art. For example, should granular product contained within the cartridge exit the cartridge at the point of penetration, the extraction member described herein is less likely to suffer a blockage than a hollow, flow-through tube or needle. Additionally, the reduced need for a seal around the extraction member allows the extraction member to penetrate a smaller distance into the cartridge. This, in turn, allows the cartridge to be shallower, resulting in reduced manufacturing, packaging and shipping costs.

It will be understood that any reference in the specification to "upper" and "lower" elements are made in relation to the brewing chamber and extraction member as they are arranged and positioned when in use (i.e., as shown in the Figures). Similarly, any reference to "horizontal" and "vertical" will also be understood in relation to the brewing chamber and extraction member as positioned when in use.

Persons skilled in the art will appreciate that there are yet more alternative implementations and modifications possible for implementing the embodiments, and that the above implementations and examples are only illustrations of one or more embodiments. Those skilled in the art will also appreciate that various aspects of the embodiments described herein can be combined with aspects of other embodiments. The scope, therefore, is only to be limited by the claims appended hereto.

The invention claimed is:

1. A brewing chamber comprising: a housing having inlet and outlet end and a channel extending between the inlet and outlet ends; the channel defining an inner surface of the housing extending from the inlet end to the outlet end and configured to direct liquid to the outlet end;
a cartridge penetrating extraction member extending into the channel from the inner surface, the cartridge penetrating extraction member having an open penetrating end for penetrating a cartridge and a closed anchoring end abutting the inner surface of the housing intermediate the inlet and outlet ends and above the outlet end of the housing; the cartridge penetrating extraction member further having a substantially tubular member extending between the open penetrating end and the closed anchoring end for guiding liquid from the open penetrating end directly onto the inner surface of the housing above the outlet end of the housing; the tubular member having a chase or other guide means extending along the tubular member from the open penetrating end to a point intermediate the open penetrating end and the closed anchoring end,
wherein the substantially tubular member of the cartridge penetrating extraction member is substantially cylindrical and extends between the open penetrating end and the closed anchoring end of the cartridge penetrating extraction and the guide means has at least one longitudinal groove on the surface of the substantially tubular member; the at least one longitudinal groove extending from the open penetrating end towards the closed anchoring end.

2. The brewing chamber of claim 1, wherein the extraction member extends substantially vertically from the inner surface.

3. The brewing chamber of claim 1, wherein the guide means of the cartridge penetrating extraction member comprises a longitudinal slot in a side of the tubular member.

4. The brewing chamber of claim 3, wherein the tubular member is obstructed between the closed anchoring end of the cartridge penetrating extraction member and a lower end of the longitudinal slot.

5. The brewing chamber of claim 1, wherein the cartridge penetrating extraction member is integrally formed with the inner surface of the housing.

6. The brewing chamber of claim 1, wherein the cartridge penetrating extraction member is integrally formed with the housing.

7. The brewing chamber of claim 1, further comprising support means for supporting the cartridge within the channel.

8. In a brewing chamber having a housing including an inlet and outlet end and a channel extending between the inlet and outlet ends, an outlet portion of the channel defining an inner surface extending from the inlet end to the outlet end and configured to direct liquid towards the outlet end, wherein the improvement comprises a cartridge penetrating extraction member having:
(a) a closed anchoring end abutting the inner surface of the housing; and
(b) a substantially tubular member extending upwardly from the closed anchoring end to an open penetrating end for penetrating a cartridge, the substantially tubular member having a chase or groove to guide liquid from the open penetrating end and the chase or groove directly onto the inner surface of the housing,
wherein the substantially tubular member of the cartridge penetrating extraction member is substantially cylindrical and extends between the open penetrating end and the closed anchoring end of the cartridge penetrating extraction and the guide means has at least one longitudinal groove on the surface of the substantially tubular member; the at least one longitudinal groove extending from the open penetrating end towards the closed anchoring end.

9. The extraction member of claim 8, wherein the chase on the substantially tubular member comprises a longitudinal slot in a side thereof.

10. The extraction member of claim 8, wherein the substantially tubular member extends substantially vertically from the closed anchoring end to the open penetrating end.

11. The extraction member of claim 8, wherein the substantially tubular member is substantially cylindrical and the groove is at least one longitudinal groove on the surface thereof, the at least one longitudinal groove extending from the open penetrating end towards the closed anchoring end.

* * * * *